United States Patent [19]

Balyasny

[11] Patent Number: 4,674,666
[45] Date of Patent: Jun. 23, 1987

[54] APPARATUS FOR CLEAVING AN OPTICAL FIBER

[76] Inventor: Marik Balyasny, 7358 Ruffner Ave., Van Nuys, Calif. 91406

[21] Appl. No.: 850,218

[22] Filed: Apr. 10, 1986

[51] Int. Cl.<sup>4</sup> ............................................. C03B 37/16
[52] U.S. Cl. ..................................... 225/96; 225/101; 225/105; 225/106
[58] Field of Search ................ 225/96, 96.5, 101, 105, 225/106

[56] References Cited

U.S. PATENT DOCUMENTS 4,530,452  7/1985  Balyasny et al. ..................... 225/96
4,557,049 12/1985  Cribbs et al. ..................... 225/96 X
4,621,754 11/1986  Long et al. ............................. 225/96

Primary Examiner—Frank T. Yost

[57] ABSTRACT

This invention relates to optical fiber cleaving tools where the optical fiber is held in a first clamping device, a portion of said fiber is passed through and elongated open which is coaxial with the long axis of said fiber, and through a second coaxial clamping device, which places said fiber in tension. A sharp pointed means is positioned between the exit of said elongated opening and said second clamping device, adjusted to score the circumferential periphery of said fiber. The tension on said fiber causes it to cleave in a mirror-surface plane which is substantially perpendicular to the longitudinal axis of said fiber. Herein, the cleaving tool of this invention produces mirror-surface ends, at least about 1° of the desired 90°, and even essentially 90°. In this invention the second clamping device is distinguished in that one clamping face is an arc of a defined circular circumference. Also this cleaving tool is unique in its capability of cleaving either buffered optical fiber or bare optical fiber, with the results as set out above.

7 Claims, 5 Drawing Figures

APPARATUS FOR CLEAVING AN OPTICAL FIBER

This invention relates to an apparatus for cleaving an optical fiber in a plane substantially perpendicular to the longitudinal axis of said optical fiber. The invention also relates to cleaving a buffered optical fiber.

BACKGROUND OF THE INVENTION

U.S. Pat. No. 4,530,452, dated July 23, 1985, to Marik Balyasny and William F. Lovell, describes an apparatus for cleaving an optical fiber, which apparatus is also known as a cleaving tool. (The Marik Balyasny of said U.S. Pat. No. 4,530,452 and the Marik Balyasny of the instant patent application are one and the same person.) The instant invention described in this application performs the cleavage of the Balyasny-Lovell apparatus in an improved and novel manner.

OBJECTS

An object of the invention is to provide cleaving of an optical fiber, under tension, by scoring the circumferential periphery of said optical fiber for an arc portion sufficient to permit cleavage.

Because at times the optical fiber is not truly circular and a more or less elliptical shape, it is another object of the invention to obtain cleavage using a score less than 360° of the periphery.

It is a further object of the invention that a 360° score of the periphery of the optical fiber be obtainable when the optical fiber is reasonably circular.

Yet another object of the invention is to obtain a cleavage plane which is substantially perpendicular to the longitudinal axis of the optical fiber being cleaved. A cleavage plane which is within about 1° of perpendicular (spoken as 90°herein) is desirable, and essentially 90° is preferred.

Still another object of the invention, especially preferred, is to provide a cleaved optical fiber having the plane of the cleaved end a mirror-surface, which does not require subsequent polishing.

A further object of the invention is an apparatus capable of cleaving a wide range of diameters of optical fibers. For illustration, from about 100 microns to about 600 microns in diamenter.

Still a further object of the invention is an apparatus capable of cleaving a buffered optical fiber, where the optical fiber component is cleaved in accord with the aforesaid objects.

Other objects of the invention will be evident from the detailed description of the invention, hereinafter.

DEFINITIONS

The term "optical fiber" as used herein may be any one of:
(i) a step-index profile fiber made up of a fiber core and at least one layer of fiber cladding thereon; or
(ii) a graded-index profile core; or
(iii) either of these provided with an optical fiber protective coating, which coating is a thin film bonded to the core or cladding, as the case may be, to afford protection against abrasion and/or corrosion, illustrative of such films are titanium dioxide, magnesium dioxide, silicon monoxide. It is to be understood that the defined core and defined cladding may be of glass or plastic.

The term "optical fiber diameter" as used herein mean the outside diameter of the hereinabove defined optical fiber.

Usually, the optical fiber is enclosed by a fiber buffer for mechanical isolation and protection.

The aforedefined buffered optical fiber may be further enclosed by a jacket of protective material, harder than the buffer material, which jacketed unit is commonly referred to as an optical fiber cable, or a single-fiber cable.

The afore definitions comply with usage of: Fiber Optics and Lightwave Communications Dictionary, M.H.WEIK, copyright 1981, Van Nostrand Reinhold Co. Fiber Optics and Lightwave Communications Vocabulary. Dennis Bodson. Copyright 1981. McGraw Hill Publications.

SUMMARY OF THE INVENTION

This invention is directed to an apparatus for cleaving an optical fiber, that is a cleaving tool. Said optical fiber may be a hereinbefore defined optical fiber or the optical fiber within a buffered optical fiber. The cleaving tool comprises: shaft means having an axially extending opening means therethrough for receiving therein an optical fiber or a buffered optical fiber; a transfer block having a support surface thereon for supporting said optical fiber or said buffered optical fiber (hereinafter the term 'member fiber' is used to designate one or the other of these). The transfer block is pivotally joined to aforesaid shaft means; the transfer block support surface is formed as an arc of the circumference of the circle which would circumscribe the radial distance from the support surface to the pivot joining the transfer block to the shaft means. Lever means is pivotally mounted on the transfer block for selectively moving a member fiber holding pad toward or away from, respectively, the defined arcuate support surface in order to grip or to release a member fiber extending from said axial opening. Spring means is positioned with respect to the shaft means and the transfer block so that upon movement of the lever means, which brings the holding pad into contact against a member fiber on the support surface, the support surface is moved away from the axially extending opening and a member clamped thereon is placed in tension. Sharp pointed means is rotatably mounted on the shaft means for contacting the circumferential periphery of an optical fiber extending between the axial opening and the support surface. The sharp pointed means is adapted to effect a score line for at least a sufficient portion of the optical fiber circumference to permit cleavage of the member fiber, by the tension thereon, in a plane of the optical fiber that is substantially perpendicular to the longitudinal axis of the optical fiber.

Locking means may be provided to maintain the holding pad in spaced relation to the support surface.

Desirably, the axially extending opening is sized to accept a buffered optical fiber for a partial length of the axial opening and further sized to accept optical fiber, freed of buffer, for the remainder of the length of the axial opening.

Preferably, the axial opening means including the axially extending opening is separable from the shaft means, permitting insertion of axial openings each adapted to accept an optical fiber of a particular specified for cleaving.

Usually, the cleaving tool is provided with sharp pointed means adapted to effect a single score line which extends substantially completely around the circumferential periphery of the optical fiber to be cleaved.

The aforedescribed cleaving tool is capable of providing a cleaved optical fiber whose cleaved end is a planar surface less than 1° from perpendicular, that is 90°, to the longitudinal axis of the cleaved optical fiber.

DETAILED DESCRIPTION

It is to be understood that whether the cleaving involves the defined optical fiber alone or the defined buffered optical fiber, it is the outer periphery of the optical fiber itself, with or without buffer component, that must be scored in order to obtain the desired planar, substantially perpendicular cleavage of the optical fiber. In other words: When a buffered optical fiber is to be cleaved, the sharp pointed means must cut through the buffer and also score a sufficient arc of the periphery of the optical fiber within the buffer.

The FIGURES set forth a preferred embodiment of the apparatus (cleaving tool) of the invention. This embodiment is of a hand operated portable tool. However, the tool is readily adapted for attachment to a work table or for wall mounting.

Figure 1:
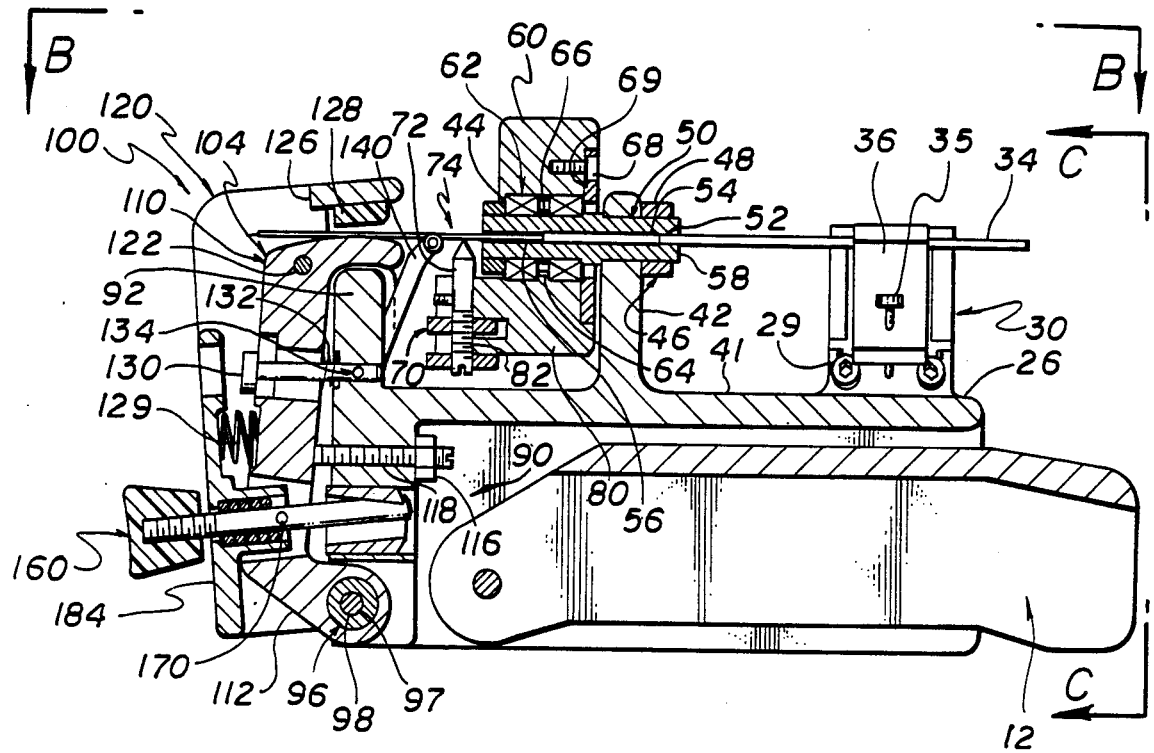
FIG. 1 is a side sectional view of one embodiment of the apparatus of this invention, with optical fiber clamp in open position, taken along the line A—A of FIG. 2.
Figure 2:
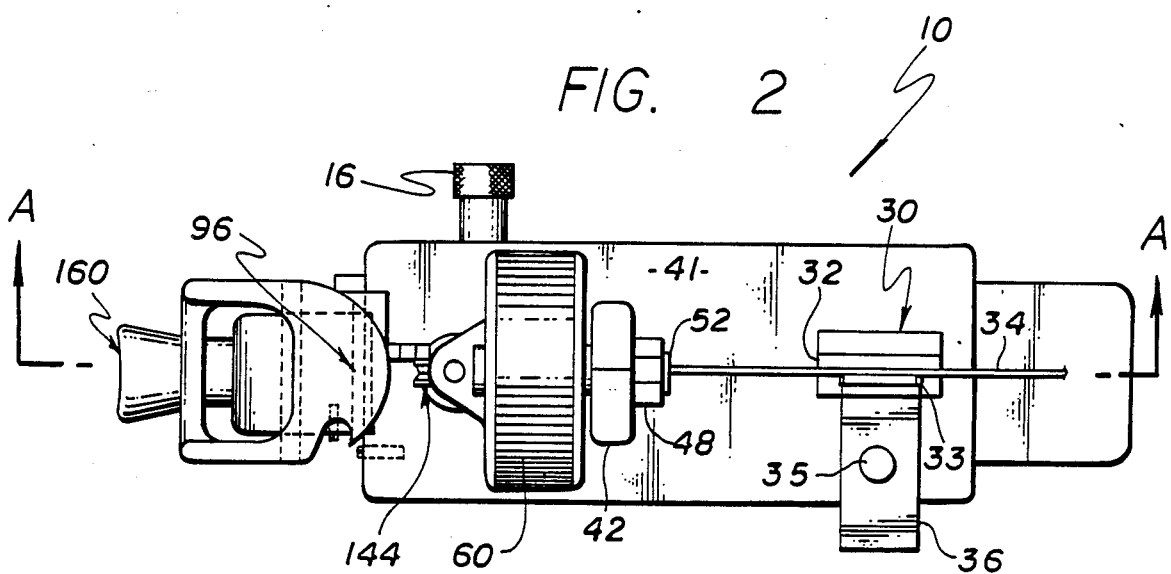
FIG. 2 is a top view of the tool of FIG. 1 taken along line B—B of FIG. 1.
Figure 3:
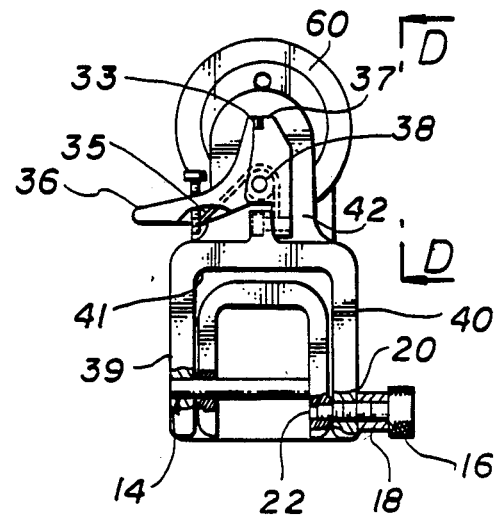
FIG. 3 is a left side view of the tool of FIG. 1 taken along line C—C of FIG. 1.

In FIGS. 1, 2, and 3, a base 10 houses a rotatable handle 12 which handle 12 can be rotated to a position approximately perpendicular to the length of base 10, to afford a pistol grip. A dowel pin 14 (FIG. 3) is the pivot for rotating handle 12. The handle 12 is locked in place by spring loaded pin 16, positioned in collar 18 and an opening 20 in base 10, which is adapted to retractably enter or exit a reception hole 22 in handle 12.

At the rear end 26 of base 10 there is mounted by screws 29 a buffered optical fiber positioning and clamping bracket 30 (FIGS 1 and 2). The bracket 30 include square channel 32 and clamping pad 33 where the buffered optical fiber 34 is clamped. A knurled head set screw 35 positions and fixes a cover plate 36 which, moving about pin 38, holds buffered optical fiber 34 clamped against base 37. Thus buffered optical fiber 34 can be secured in the cleaving tool while the operator works on setting up the cleaving and other parts of the tool, whithout being concerned about losing said fiber. And when the cleaving action is initiated the clamp at base 37 aids in placing said fiber 34 in necessary tension.

Base 10 is an inverted roughly U-shape with handle 12 nesting between the walls 39 and 40 of the "U"(FIG. 3). The bottom 41 of the U-shaped base 10 is provided with an upstanding wall element 42 positioned across the short-side of the bottom 41. Wall element 42 includes an opening 44 withing which a shaft means 46 is fittingly received at substantially 90° to the wall element 42. The outer end of shaft means 46 is secured firmly by nut 48 to wall element 42.

Shaft means 46 includes a shaft 50, which shaft 50 includes an axially extending opening means 52 passing therethrough, for receiving either an optical fiber, or a buffered optical fiber, or both, for a partial length, respectively, of said opening means 52. In this embodiment, said opening means 52 is sized, beginning at about the nut 48 end, to accept a buffered optical fiber for a partial length 54 of the axial opening, and then further sized 56 to accept, fittingly, optical fiber that has been stripped of the buffer coating., portion 56 is referred to as an optical fiber alignment sleeve.

The entrance end at nut 48 of shaft means axial opening has an enlarged tapered mouth 58 for aiding the insertion of the buffered optical fiber.

Preferably the axial opening means is separable from the shaft means, to permit insertion of axial openings, each adapted to accept an optical fiber of a particular specified diamenter for cleaving, or to accept a buffered optical fiber of a particular specified diameter for cleaving.

A drum (rotor) 60 (FIGS. 1, 2, 3 and 4) of generally disclike construction, with a knurled periphery, is rotatably journaled about shaft 50 via bearings 62, provided with spaces 64 and 66 and screw 68 secures drum cover 69.

A sharp pointed means 70 is rotatably mounted on shaft means 46 by way of drum 60. Sharp pointed means 70 is provided with a scriber (scoring means) 72 for contacting the circumferential periphery of an optical fiber extending between the exit end of axial opening 52 and a hereinafter described support surface. The scoring means 72 has one end formed into a suitable sharp point 74 to effect a score line on the optical fiber circumferential periphery. Drum 60 is rotated to cause the sharp point 74 of the scriber 72 to effect a score line of at least a sufficient portion of the optical fiber circumference to permit cleavage of the optical fiber (and the buffer, if any) by tension, imposed thereon in a hereinafter described manner, in a plane that is substantially perpendicular to the longitudinal axis of the optical fiber.

A portion of drum 60 extends outwardly from the inwardly directed major face to form an element 80 through which an opening 82 is formed perpendicular to the axial opening in the shaft means. The scoring means 72 herein is a rodlike element having one end formed into a suitable sharp point 74 which rodlike element is inserted through opening 82. Preferably sharp point 74 is a diamond tip. The opposite end of fiber scoring means 72 is threaded for reception by first and second knurled nuts 84 and 86 (FIG. 4), for vertical alignment of point 74 to proper scoring position.

Preferably the sharp point is adapted to effect a single score line extending substantially completely around the circumferential periphery of the optical fiber to be cleaved.

Base 10 includes a closure 90 of the U-shaped portion. Above closure 90, on the flat portion 41 is a second upstanding wall element 92 whose upper end terminates below the axial line established by axially extending opening means 52 and said end is formed in a generally arcuate shape.

Closure 90 has an opening 96 (FIG. 2) at roughly the end of the U walls 39 and 40 of the base 10, for receiving a self-lubricated bushing 97 and dowel pin 98.

Transfer block means 100, through a support surface 104, supports the optical fiber to be cleaved. Support surface 104 forms one end (leg) of an element 110; the other end (leg) 112 is provided with an opening 96 for receiving bushing 97 in such a manner that element 110 can pivot about pin 98, so that support surface 104 can rotate to circumscribe a part of the circumference of a circle having the radial distance from support surface 104 to opening 96, that is, the pivot joining transfer block 100 to base 10, which is part of shaft means 46; the upper surface of support surface 104 is formed as an arc of the circumference of the aforedescribed circle. This arc-shape results in the optical fiber resting on the support surface maintaining its coaxial relationship with axial opening 52 as support surface 104 is moved around pin 98. This coaxial relation is crucial to obtaining a cleaved planar surface essentially approaching 90° with respect to the longitudinal axis of the optical fiber, and also obtaining a mirror-surface end. The closest distance between the transfer block 110 and the wall 92 is controlled by set screw 118 and locking nut 116. This will controll a travel of element 110 and a compression of spring 132 that determines the amount of tension applied to the optical fiber to be cleaved.

Lever means 120 is pivotally located on transfer block 100 through pin 122. At the support surface end of lever means 120 is set arm 126 including optical fiber holding pad 128. Movement of lever means 120 permits selectively moving the fiber holding pad 128 toward or away from, respectively, the arcuate support surface 104 in order to grip, by action of spring 129, or to release an optical fiber (or buffered optical fiber) extending from axial opening 52.

FIG. 1 shows the cleaving tool with the holding pad 128 in spaced relation to the support surface 104. The optical fiber rests on the support surface without constraint. A headed stop pin 130 passes through an opening in element 110 and another opening in wall element 92; a spring 132 applies a tension to optical fiber and is positioned between wall element 92 and element 110; set screw 134 permits locking pin 130 at a particular position that wil control a travel of element 110 to its remote position.

Figure 5:
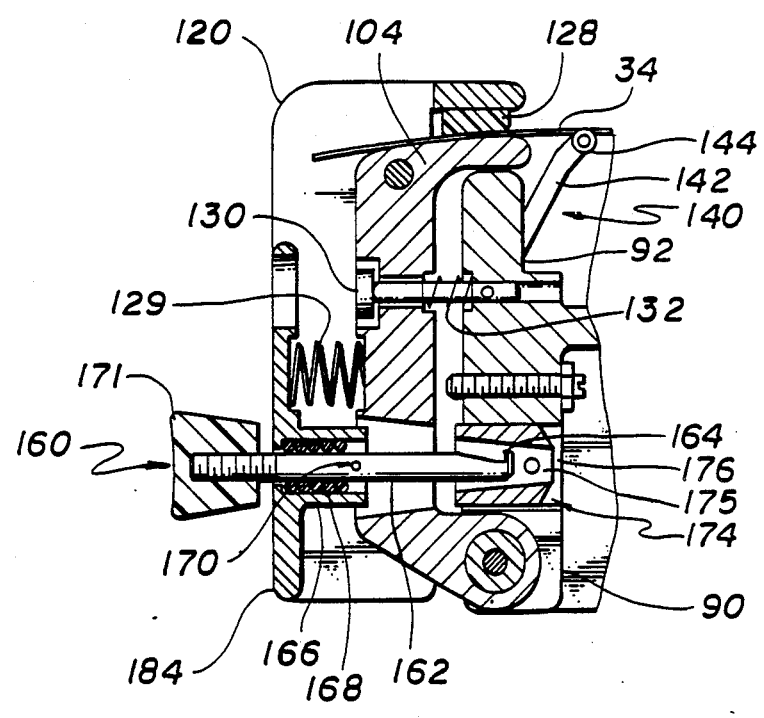
FIG. 5 is a side sectional view of the tool of FIG. 1 showing the optical fiber clamp, and related elements, in clamping (that is, closed) position.

FIG. 5 shows the cleaving tool in optical fiber clamp 189 clamping position. Spring 129 pivots lever means 120 bringing holding pad 128 into contact with the optical fiber and clamping it against support surface 104. After that (almost simultaneously) spring 129 forces element 110 away from wall 92 along with support surface 104 and the optical fiber clamped thereon, away from the axial opening so that the clamped optical fiber is placed in tension, ready for cleaving.

Figure 4:
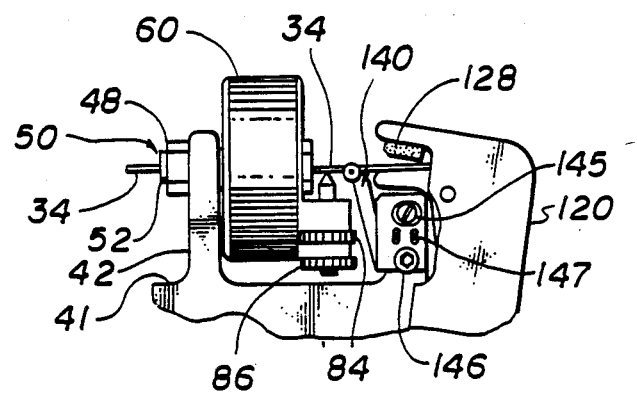
FIG. 4 is a partial back view of the tool of FIG. 2 taken along the line D—D of FIG. 3 of the optical fiber alignment and scribe elements of the tool.

This embodiment has a bracket 140 (FIGS. 1, 2 and 4) to further control the vertical and axial alignment of the optical fiber at the moment of cleaving. Bracket 140 comprises an arm 142 adjustably fixed to wall 92, having at the upper end of said arm 142 a V-grooved roller 144 (FIGS. 2,4 and 5). In FIG. 4, the adjustments for arm 142 are eccentric screw 145, screw 146 and dowel pins 147 (as precision guides).

FIGS. 1 and 5 show a locking means 160 which can maintain the holding pad 128 in spaced relation to the support surface 104. Locking means (clamp positioner) 160 is located in a lower portion of lever means 120. Locking means 160 comprises an elongated rod 162 having a tooth 164 at the far end of the rod; a chamber 166 affixed to lever means 120 houses rubber O-rings 168, retained by a dowel pin 170. A cap 171 is positioned on the near end of rod 162. Rod 162 passes through an opening in element 110 and into an opening 174 in wall 90; a lock-bushing 176 is positioned in opening 174 and is secured by set screw 175. Force applied to lever means 120, for instance at point 184, moves the rod forward compressing spring 132, spring 129, and mving holding pad 128 away from support surface 104, until tooth 164 engages a lip of bushing 176; thus holding pad 128 is locked away from in spaced relation to the support surface 104, as shown in FIG. 1. Also rod 162 is slightly deflected by spring loading and O-rings 168 are compressed.

In FIG. 5, the cleaving tool is shown in optical fiber clamping position, holding pad 128 and support surfce 104 clamp against optical fiber 34. This condition is obtained by disengaging tooth 164 and bushing lip 176; O rings 168 pull away from lip 176, stabilizing the clamp positioned 162; spring 129 pushes lever means 120 causing it to rotate about pivot 122 moving pad 128 downward against optical fiber 34 on support surface 104. Transfer block means 100 is moved simultaneously away from wall 92 by action of spring 132. This movement of transfer block 100 moves the optical fiber clamped between pad 128 and support surface 104 longitudinally and places it in tension, ready for cleaving.

It is to be understood that numerals placed on elements in FIG. 5 also apply to those same elements shown in FIG. 1; also numerals placed on elements in FIG. 1 apply to those same elements in FIG. 5.

EXEMPLARY

The embodiment of the apparatus of the invention shown in the figures, in conjuction with separable axial opening means suitable for various optical fibers and buffered optical fibers, was used to cleave commercially available optical fibers. Some of these optical fibers were step-index profile optical fibers made up of a glass core enclosed by glass or plastic cladding. Others of these optical fibers were graded-index profile optical fibers made-up of a glass core and a plastic cladding. Usually these components were enclosed by a plastic fiber buffer for protection. The diameter of the commercial core/cladding component ranged from about 125 microns to about 525 microns.

In each test a suitable length of the particular buffered optical fiber was stripped of buffer. The bare optical fiber was place in clamping means 30, passed through axial opening means 52 and beyond to support surface 30. The bare optical fiber was passed along unti the end of the buffered optical fiber abutted the reduced diameter portion of opening 52, the the buffered optical fiber was clamped in means 30. The bare optical fiber was then clamped between holding pad 128 and support surface 104 and automatically being placed under the proper tension. The sharp pointed means, diamond tipped, with the proper intrusion into the surface of the optical fiber, was adjusted to score the periphery of the optical fiber, now held in tension.

In the above tests, it was observed that all diameters of these commercial optical fibers were cleaved using scoring arcs ranging from roughly 60° to a full 360°. In all cases, the cleaved end was a mirror-surface plane, which did not require polishing before use in a connection. Also, the cleaved plane was, in all cases, less than 1° of the desired 90° perpendicular to the optical fiber longitudinal axis; in most cases, the cleaved plane wa essentially 90°.

In another series of tests, buffered optical fibers were cleaved, as such, that is, the buffering plastic was not removed before cleaving, as was done in the earlier tests. Buffered, step-index profile glass core and cladding, optical fibers obtained from the commercial makers Corning and Corgard were used in these tests. These buffered optical fibers measured: 125 microns for the optical fiber component and 250 microns for the buffered plastic exterior diameter. Four of the defined fibers were cleaved in the cleaving tool, except that the axial opening was of a single diameter to pass fittingly the buffered optical fiber. Each buffered optical fiber was cleanly cleaved: the cleaved optical fiber had a mirror-surface plane. The cleaved surface plane ranged from 0° to 0°40' off the 90° perpendicular. This represents a unique accomplishment in the cleaving of buffered optical fiber.

Thus having described the invention what is claimed is:

1. Apparatus for cleaving an optical fiber comprising: shaft means having an axially extending opening means therethrough for receiving therein a member of the group consisting of (i) an optical fiber and (ii) a buffered optical fiber;
   a transfer block having a support surface thereon for supporting said member fiber;
   said transfer block being pivotally joined to said shaft means, and said transfer block support surface is formed as an arc of the circumference of the circle which would circumscribe the radial distance from said support surface to the pivot joining said transfer block to said shaft means;
   lever means pivotally mounted on said transfer block for selectively moving a member fiber holding pad toward or away from, respectively, the defined arcuate support surface in order to grip or to release a member fiber extending from said axial opening;
   spring means positioned with respect to said shaft means and said transfer block so that upon movement of said lever means, which brings said holding pad into contact against a member fiber on said support surface, said support surface is moved away from said axially extending opening and a member fiber clamped thereon is placed in tension;
   sharp pointed means rotatably mounted on said shaft means for contacting the circumferential periphery of an optical fiber extending between said axial opening and said support surface;
   said sharp pointed means is adapted to effect a score line for at least a sufficient portion of the optical fiber circumference to permit cleavage of the member fiber, by the tension thereon, in a plane of the optical fiber that is substantially perpendicular to the longitudinal axis of the optical fiber.

2. The apparatus of claim 1 where locking means is provided to maintain said holding pad in spaced relation to said support surface.

3. The apparatus of claim 1 where said axially extending opening is sized to accept a buffered optical fiber for a partial length of said axial opening and further sized to accept optical fiber, freed of buffer, for the remainder of the length of said axial opening.

4. The apparatus of claim 1 where said axially extending opening is sized to accept a buffered optical fiber throughout the length of said axial opening.

5. The apparatus of claim 1 where said axial opening means is separable from said shaft means, permitting insertion of axial openings each adapted to accept a member fiber of a particular specified diameter, for cleaving.

6. The apparatus of claim 1 where said sharp pointed means is adapted to effect a single score line extending substantially completely around the circumferential periphery of the optical fiber to be cleaved.

7. The apparatus of claim 1 where travel adjustment means are present, positioned to control travel of said lever means toward said shaft means, thereby permitting fine control of the tension placed on the clamped member fiber prior to the cleaving thereof.

* * * * *